United States Patent
Stummer

(10) Patent No.: US 7,115,070 B2
(45) Date of Patent: Oct. 3, 2006

(54) SYSTEM FOR THE CONTROL OF MULTIPLE ENGINES IN A MULTI-COMBINATION VEHICLE HAVING INDEPENDENT THROTTLE CONTROLS WHEN UNDER EMERGENCY BRAKING

(75) Inventor: Mark J. Stummer, Westlake (AU)

(73) Assignee: James W. Cooper, Northern Territory (AU)

( * ) Notice: Subject to any disclaimer, the term of this patent is extended or adjusted under 35 U.S.C. 154(b) by 232 days.

(21) Appl. No.: 10/968,665

(22) Filed: Oct. 18, 2004

(65) Prior Publication Data

US 2006/0084550 A1 Apr. 20, 2006

(51) Int. Cl.
*F02D 9/06* (2006.01)
*B60K 5/08* (2006.01)
*B62D 53/00* (2006.01)

(52) U.S. Cl. .......................... 477/205; 477/2; 180/14.2
(58) Field of Classification Search .................... 477/2, 477/203, 205, 206, 210; 701/50; 180/14.2
See application file for complete search history.

(56) References Cited

U.S. PATENT DOCUMENTS

| | | | | |
|---|---|---|---|---|
| 3,743,064 A | * | 7/1973 | Luft | 477/2 |
| 3,845,629 A | * | 11/1974 | Luft | 60/719 |
| 5,330,020 A | * | 7/1994 | Ketcham | 180/14.2 |
| 5,439,429 A | * | 8/1995 | Lee | 477/205 |
| 6,843,351 B1 | * | 1/2005 | Stummer | 180/14.2 |
| 6,892,839 B1 | * | 5/2005 | Cooper | 180/14.2 |
| 2005/0000739 A1 | * | 1/2005 | Leclerc | 180/14.2 |
| 2005/0024001 A1 | * | 2/2005 | Donnelly et al. | 318/66 |

* cited by examiner

*Primary Examiner*—Roger Pang
(74) *Attorney, Agent, or Firm*—Francis Law Group

(57) ABSTRACT

A system is provided for the throttle control of a multi-combination vehicle operable by a driver where said vehicle includes at least two engines each engine operable by an independent throttle. One of the throttles is controlled by a standard throttle pedal, the other by a hand-controlled throttle. Under conditions of severe braking the second throttle is caused to be disregarded by the second engine that is forced to an idle position. Further, the second throttle can only become operable when the second throttle has been manually reset to a pre-determined position, generally the idle position. The system is appropriate in cases where the driver may be forced to apply emergency braking and is not able to control the hand throttle to ensure that the second engine does not continue to drive the vehicle. A further improvement to the invention lies in the fact that under emergency braking the transmission system coupled with the second engine, generally automatic, is forced to convert mode to protect the transmission from damage.

11 Claims, 8 Drawing Sheets

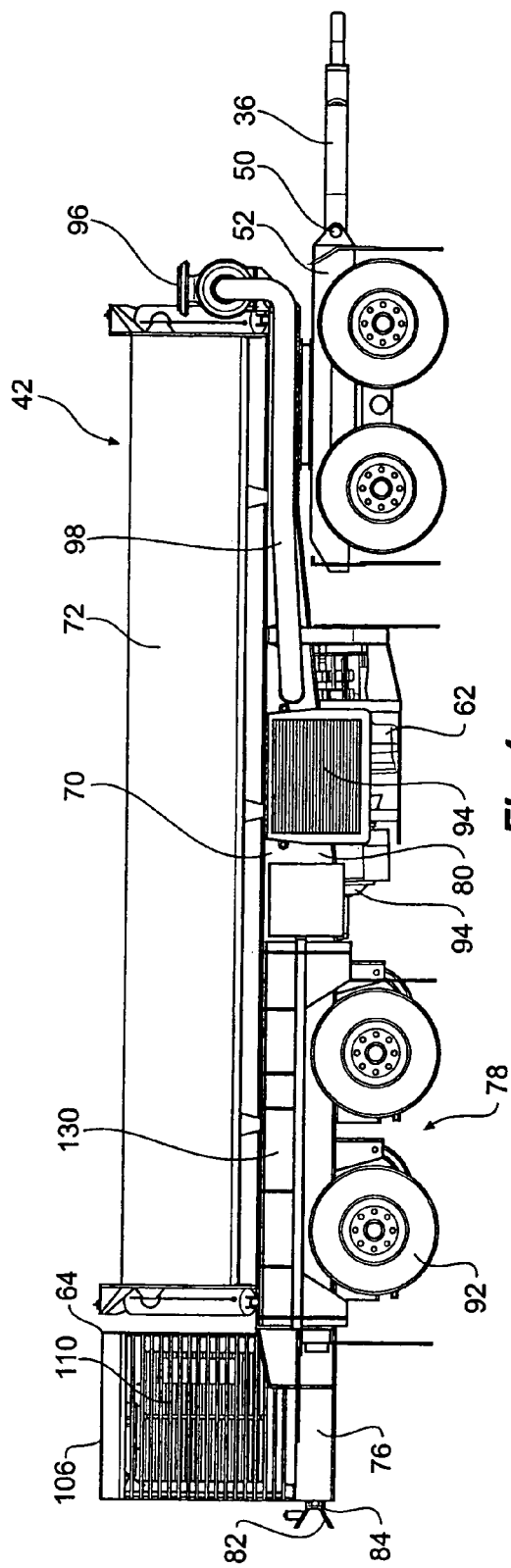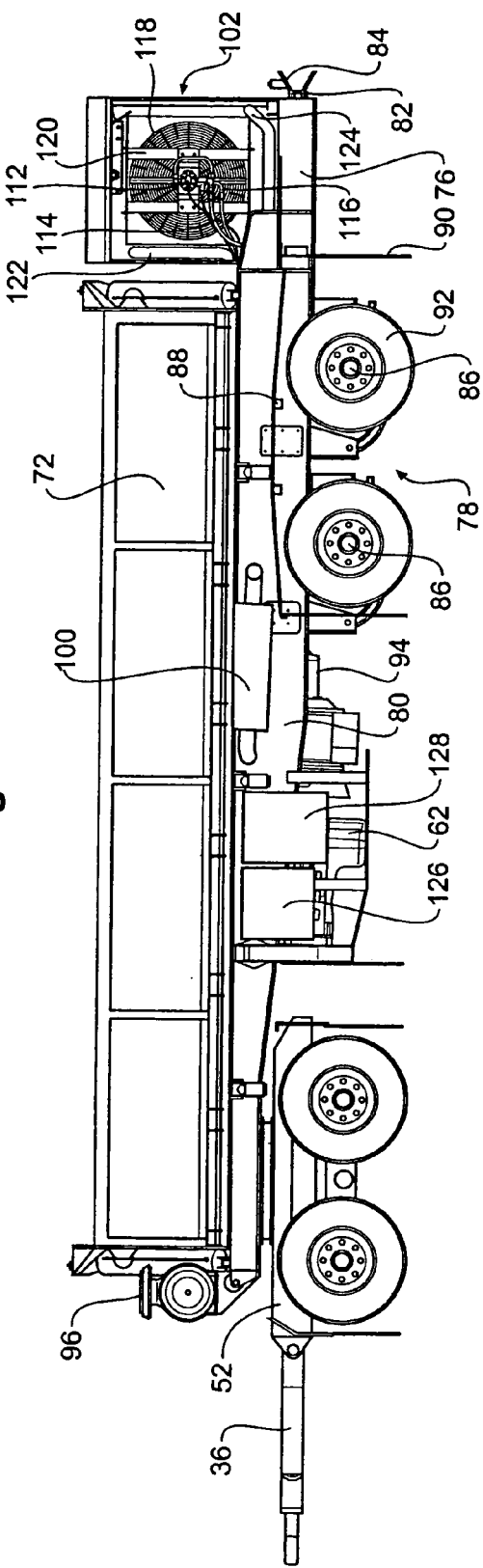

SYSTEM FOR THE CONTROL OF MULTIPLE ENGINES IN A MULTI-COMBINATION VEHICLE HAVING INDEPENDENT THROTTLE CONTROLS WHEN UNDER EMERGENCY BRAKING

This application is filed pursuant to 35 U.S.C. §371 as a United States National Phase Application of International Application No. PCT/AU03/00205, filed Feb. 19, 2003.

BACKGROUND

1. Field of the Invention

The present invention is directed to a throttle control system of a secondary engine in a multi-combination vehicle where there are at least two engines, each engine being controlled by a separate throttle control. Typically the multi-combination vehicle includes a truck and a power trailer. A standard pedal throttle provides the throttle control for the truck engine whilst the throttle for the power trailer engine is provided by a separate throttle control, typically a hand throttle. The present invention is particularly useful in the case where the transmission systems of the truck and the power trailer may not be matched, such as the case where the truck transmission is a manual one and the power trailer transmission an automatic one. It is to be understood that the above invention is not limited to a multi-combination vehicle, it may also equally well apply to any vehicle having two or more engines even if it is only one vehicle having two engines.

2. Related Art

Operators of heavy haulage products, such as mines, are constantly searching for ways to reduce the costs associated with hauling their product, in this case ore. One of the most significant costs in operating a mine is transporting the mined material from the ore face to a processing plant. This is exacerbated when the mined payload is of low grade, that is, the desired mineral or metal is only a small percentage by weight and/or volume of the mined ore so that substantial amounts of ore have to be handled to extract a small percentage of desired material. A further problem that occurs is where the ore has to be handled several times.

There are several ways that ore can be transported from the ore face to the processing plant, depending on the type and configuration of the mine.

Underground mines typically have a central lifting or winding shaft to bring the mined ore to the surface. These shafts require a dedicated receival point. To get the ore to that point mines typically have a dedicated rail system that is level and route specific. Underground mine haulage or dump trucks are used to transport the ore from various mining levels both above and below the rail haulage level to the dedicated rail system that then transports the ore to the lifting shaft receival point. The trucks are always a single unit that is either rigid or pivot steered. This type of arrangement has a number of distinct disadvantages.

The dump trucks cause a significant amount of hot air per ton of ore hauled to be exhausted into the mine. Cold ventilation air has to be continually pumped into the mine via ventilation shafts, and one of the major costs in establishing underground mines is the construction and drilling of ventilation shafts. Because of the limitation of currently known dump trucks, the time that they can operate underground is limited, particularly due to excess heat they produce. To reduce the heat, the dump trucks have to move relatively slowly.

A railway system, especially one underground, is relatively expensive to install and operate due to the cost of acquiring the locomotive and installing the fixed railway system and the associated maintenance costs. Furthermore the underground railway system being route-specific is not flexible to changes in route without incurring the expense of installing additional railway tracks. As each new mining area opens, it is necessary to incur the cost of installing new track for the railway system, or to use the dump trucks as described above whose efficiency decreases with the increasing distances they have to travel.

The central lifting or winding shaft is quite expensive, the cost running into tens of millions of dollars and is of a fixed location. As the mine expands the distance from the ore face to the central shaft becomes important in the cost of operating the mine.

In some instances mines have utilized conveyor belts instead of the railway system and/or the lifting shaft. The difficulty with conveyor belts is that once again they are route specific, and are quite expensive to install and maintain. Miners are also concerned that the belts may catch fire and starve the area of oxygen.

In some instances the dump trucks may be used to transport the ore directly above ground. Because of the limitations described above, especially low speed and the heat they produce, and with the inclination within underground mines generally being constant, the depth of a mine that can be realistically accessed by these dump trucks is therefore limited, typically to a depth of hundreds of metres.

When the ore has been transported to the surface, or in the case of an above ground mine, it is then necessary to transport the ore to a central processing plant.

One of the ways that this may be accomplished is by using conventional off-highway dump trucks than can either be a single rigid, pivot steer unit or an articulated vehicle consisting of a very short wheelbase earthmoving type of tractor unit coupled to a single hauled or carrying unit and virtually job specific. These units are designed to be a link in the chain of the actual mining, digging or producing the product. Their main function is to move product from the ore face to a receival point through the shortest possible distance, and they are not route-specific. The shorter the route the more economical they are. The ton of ore transported per distance costs increase dramatically over longer routes. They are therefore not suitable for hauling ore great distances, thereby limiting the distance that ore can be transported at a reasonable cost. As such, these trucks are not suitable when there may be satellite mines, that is, mines that are some distance away from the processing plant. In particular, these trucks have never been designed to be a transportation system for various reasons including the following:

(a) Their axle loadings are extreme and require appropriate roading and bridging. Wheeled or articulated dump trucks with large tires carry a significant loading per axle, up to 33 tons per axle.

(b) These types of trucks are designed for hauling loads over relatively short distances and rough terrain, have relatively large tires for relatively slow speed operation and are relatively expensive to operate and maintain due to fuel and tire costs.

(c) They produce too much heat in both their drive trains and tires. Furthermore they have poor power-to-weight ratios and low operating efficiencies.

(d) Their mass requires a large vehicle cross-section both in height and width.

(e) Their discharge methods are either: direct end-tip (non-captive) where the centre of gravity is always raised, or bottom-dump in the single articulated hauling vehicle that keeps the center of gravity down but is discharge-captive.

An alternate way of transporting the ore to a central processing plant includes conventional transportation systems such as conveyor belts systems and rail systems, both routes being captive. Problems with these systems have been discussed above.

Another way of transporting the ore is by using highway-type road vehicle combinations or multi-combination vehicles. These vehicles are limited by their horsepower, tractive or braking efforts or capacities, manufacturers' ratings of various componentry, directional stability behaviour, swept path characteristics, gradability and startability.

As a result, currently known systems for the extraction of ore from mines set limits on the commercial usefulness of mines simply due to the cost of transporting the ore.

As discussed above, multi-combination vehicles such as over-the-road vehicles are known. They include a truck coupled to a plurality of trailers and converter dollies. Until recently these vehicles have included a single power source, generally a diesel engine, with the vehicles being limited to a payload of some 170 tonnes, and a gradient not exceeding 5%. These multicombination vehicles, commonly referred to as "road-trains", have been in use for some time, particularly in Australia, for the purpose of hauling mined products, or the commodities of other industries, over aboveground roadways. Conventional above-ground road-trains are typically designed for use at relatively high speed and on relatively flat ground. They are limited by their horse power, tractive or braking efforts and their capacities that are defined by manufacturers ratings, directional stability behaviour, swept path characteristics, gradability and startability. Accordingly they have limited uses for operation in mines.

The location of the mechanical couplings between each adjacent pair of vehicles in a multi-combination vehicle as described above is positioned to maintain the side-to-side sway, or yaw, of the last vehicle within acceptable limits for above-ground, over-the-road applications. The location is not compatible for operation within an underground mine due to the relatively low operating speeds as well as the relatively narrow tunnels and small radius bends found in underground mines.

Specially configured multi-combination vehicles have been developed recently which have a significantly reduced swept path width as compared to conventional aboveground road-trains. This enables these vehicles to be used to transport various payloads such as mined ores, over the roadways existing in an underground mine. U.S. Pat. No. 6,062,801 issued on May 16, 2000 and U.S. Pat. No. 6,361,269 issued on Mar. 26, 2002, each expressly incorporated by reference herein in its entirety, describe these specially configured multi-combination vehicles which may be used in underground mines. The vehicles can operate in a tunnel system with restricted height, width, swept paths and directional path and can comply with a predetermined behaviour pattern obviating the need for the rail or conveyor system.

Even after the advent of the foregoing specially configured multi-combination vehicles, various operational problems remained to be solved with regard to the transport of mined ores in both underground and above-ground applications. For instance, due to the heavy loads of the road-train combination, the traction provided by the powered wheels of a road-train, usually provided to two rear axles, was insufficient to satisfactorily negotiate the gradients associated with the declines providing ingress and egress to and from some underground mines. Alternatively, these declines into underground mines would have to be constructed at a much gentler slope leading to excessively long tunnels. In addition, the relatively low speed of the road trains underground due to the size of the tunnels and safety considerations results in road-trains travelling underground for a significant length of time, even up to an hour in some cases. This places strain on the road-train cooling system, which is typically designed for aboveground road-trains travelling at significant speeds, generally around 80 km/h. The engines are prone to overheating.

Also, before the introduction of multi-combinational vehicles incorporating a power trailer (i.e., one having a source of motive power), which are subsequently discussed in detail, multi-combination vehicles for dedicated road haulage such as mineral concentrate haulage operated at a 170 ton payload, as noted previously. However, there is a practical limit to the payload of the multi-combination vehicle with a single truck. Since the cost of haulage is determined mainly on weight, if one can increase the total haulage that can be moved by a single vehicle that does not require additional operators, the cost benefit is substantial. This is especially so if ore can be hauled directly from within a mine to a processing plant without needing to be reloaded onto another transport system.

In order to further improve multi-combination vehicles and provide even greater advantages to the operators using these vehicles, multi-combination vehicles have been developed which utilise a truck and an additional motive power source advantageously located within the chassis of a trailer and which include a unique cooling system that enables operation of the multi-combination vehicle at low speeds, on steeper gradients and with a greater payload than previously known. International Patent Application No. PCT/AU01/01154, expressly incorporated by reference herein in its entirety, discloses a multi-combinational vehicle including a power trailer having an engine that overcomes the foregoing problems of traction and cooling of such multi-combination vehicles. International Patent Application No. PCT/AU01/01568, also expressly incorporated by reference herein in its entirety, discloses various features that may be incorporated in the drive trains of multi-combination vehicles of this type. These multi-combination vehicles, which have the ability to traverse different mining levels, have removed the need for conventional dump truck haulage from the ore face to the rail head, and also have enabled the vehicle to haul ore directly from the ore face from any underground level via an access tunnel directly to a processing plant, thereby eliminating the need for the lifting shaft. Furthermore, these types of multi-combination vehicles coupled with specifically configured power trailers, typically B-double trailers, can be used above ground to transport ore directly to a processing plant eliminating the need for other dump trucks, increasing the total payload from some 170 tons to 270 tons whilst staying within the manufacturer's rating and at the same time increasing the general behaviour pattern, thereby creating a safer multi-combination vehicle.

Use of a multi-combination vehicle using a truck and a power trailer provides a further significant advantage over conventional single-engine dump trucks, and over multi-combination vehicles having only a truck. Even if one of the engines and/or transmissions fails there is the potential to use the second engine to at least move the multi-combination vehicle out of the way or even bring it to the surface for analysis and repair. As known in the art, in the event of engine and/or transmission failure it is more than a simple exercise to retrieve a single-engine dump truck from the depths of an underground mine that is then blocking the underground road from use by other trucks. A similar problem may exist with multi-combination vehicles powered only by a single truck, or in some instances a single prime mover.

International Patent Applications PCT/AU02/00667 and PCT/AU02/00668, disclose various features in a multi-combination vehicle of the type having two engines that enable at least one engine or transmission to operate and provide propulsion to the vehicle even if the other were to fail. These two applications discuss an arrangement whereby control of both of the engines is provided by a central control system, such as the throttle control pedal used by the driver. Accordingly they rely on the two engines and transmissions systems being generally of the same capacity and type, such as having identical automatic transmissions.

However, there may be instances where it may be desirable to provide a multi-combination vehicle combining a power trailer with an automatic transmission system to an existing truck running a manual transmission system. This is especially so if one considers that the majority of current trucks that are used in road-trains are ones utilising a manual transmission system.

One of the difficulties in such an arrangement is that the power trailer engine needs to be controlled by a separate control system rather than the truck throttle pedal. Coupling a power trailer running an automatic transmission to the existing truck throttle would not work. Every time the driver changed up a gear as the truck is accelerating they would remove throttle from the truck and trailer With no fuel received by the trailer engine the automatic transmission would gear down whilst the truck transmission would be geared up. When the truck higher gear is then engaged, the trailer transmission is in the completely wrong gear causing undue stress on the trailer engine and the transmission.

For that reason it is necessary to provide for a separate trailer engine control that is operable by the driver independently of the truck engine.

However, having an independent control for the trailer engine is in itself a problem if for some reason the truck engine powers down very quickly or the driver applies heavy or emergency braking. In an emergency the normal procedure is for the driver to apply the foot brake. However, the power trailer engine continues to operate according to its throttle position independent of the application of the foot brake by the driver. This causes the power trailer engine to keep applying propulsion even where the driver has initiated emergency braking.

The inventor is unaware of any multicombination vehicle having a manual transmission truck and a powered trailer, whether it is for above ground or underground use of the type described above, where the throttle control for each engine is independent and where the power trailer engine throttle is disengaged or bypassed when the driver applies braking, in particular emergency braking.

In view of the foregoing disadvantages and limitations associated with known load-carrying vehicles, a commercial need exists for an improved load-carrying vehicle combination for use both aboveground and in underground mines that overcomes at least some of the abovementioned problems or provides the public with a useful alternative.

SUMMARY OF THE INVENTION

Accordingly, the present invention discloses a control system for use in multi-combination vehicles that enables control of a vehicle including a multi-combination vehicle or "road-train" under emergency braking.

According to one aspect of the present invention there is proposed a system for the control of engines in a vehicle operable by a driver and having at least two engines and a braking means, said system including:

a first throttle control operating said first of two engines said throttle control operable by said driver;

a second throttle control operating said second of said two engines and operable by said driver;

a braking means operable to cause said vehicle to brake, said braking means being a brake pedal operable by said driver;

a brake sensing means adapted to cause said second engine to idle when said driver applies braking greater than a pre-determined value regardless of the operation of said second throttle control.

Preferably said first throttle control is a biased pedal that when in its rest position causes said first engine to idle Preferably said biased pedal is operable by a foot of the driver.

In preference said braking means is air operated and said brake sensing means is an air switch.

Preferably said pre-determined value is greater than 30 psi.

Preferably said second throttle control is a hand throttle control operable between a first and a second position, wherein in said first position the second engine is caused to idle and in said second position said second engine is caused to be at full throttle, the hand throttle remaining in its operating position between said first and second positions independently of the operation of said first throttle, wherein when said driver applies braking said second engine is caused to idle regardless of the operating position of said hand throttle.

Preferably when said driver has applied braking, said second engine is caused to idle and to remain in the idle position until the hand throttle is operated to a reset position.

Preferably said reset position is said first position of said second throttle, wherein said second engine is caused to idle.

Preferably said system is applied to a multi-combination vehicle including a truck and a trailer, said truck powered by said first engine and said trailer powered by said second engine.

In a further aspect of the invention there is proposed a multi-combination vehicle operable by a driver including:

a powered towing unit having a first engine controlled by a first throttle, said first throttle being operable by said driver;

a power trailer, said powered towing unit and said power trailer being mechanically coupled to one another in a series arrangement, said power trailer having a second engine controlled by a second throttle, said second throttle being operable by said driver independently of said first throttle;

a braking means operable by said driver to apply braking to said multi-combination vehicle;

a braking sensing means adapted to sense when said braking greater than a pre-determined value has been applied by said driver;

a second engine throttle control means wherein when said braking sensing means senses that braking has been applied, said second engine control means causes said second engine to idle regardless of the second throttle.

Preferably when said second engine has been forced to idle, said second engine remains in the idle position until said hand throttle is brought back to an idle position.

BRIEF DESCRIPTION OF THE DRAWINGS

These and other features, aspects, and advantages of the present invention will become better understood with regard to the following description, appended claims and accompanying drawings wherein:

FIG. 4 is a right hand side elevation view of the power trailer shown in FIG. 2;

FIG. 5 is a left side elevation of the power trailer shown in FIG. 2;

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
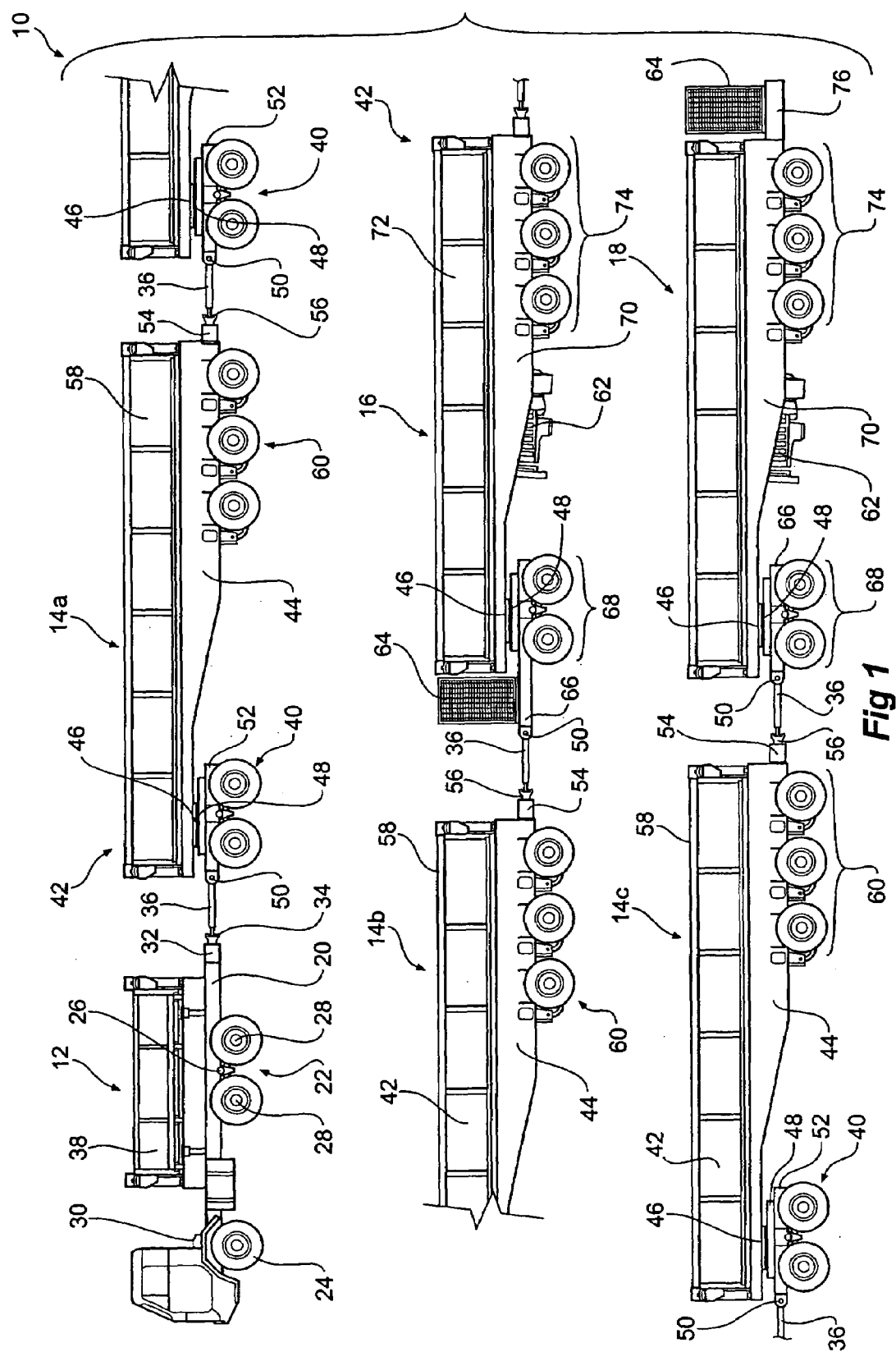
FIG. 1 is a left side elevation of a multi-combination vehicle according to one embodiment of the present invention, with the vehicle incorporating several vehicle trailers and several power trailers.
Figure 2:
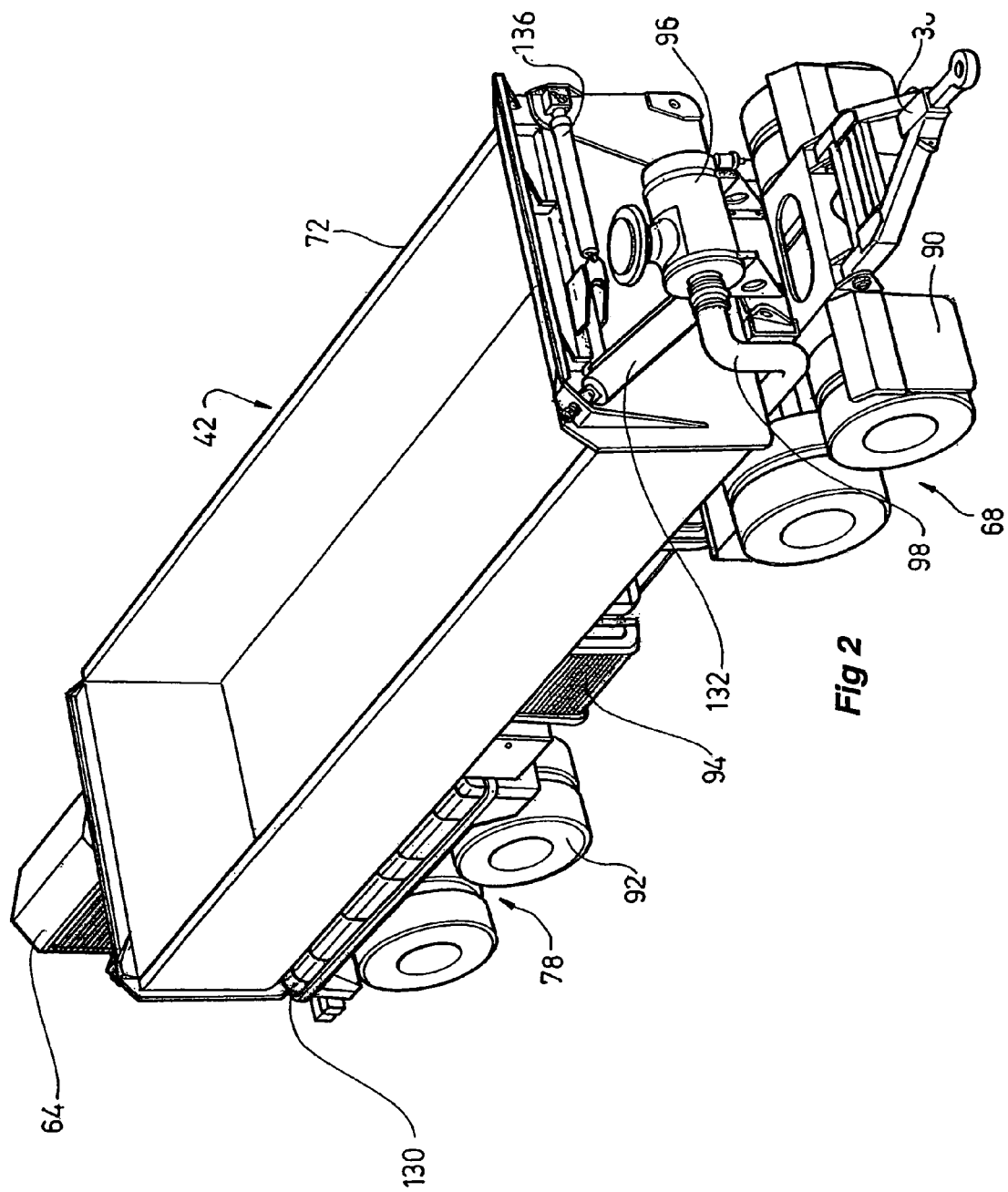
FIG. 2 is a front perspective view of a power trailer included in the multi-combination vehicle according to the present invention.
Figure 3:
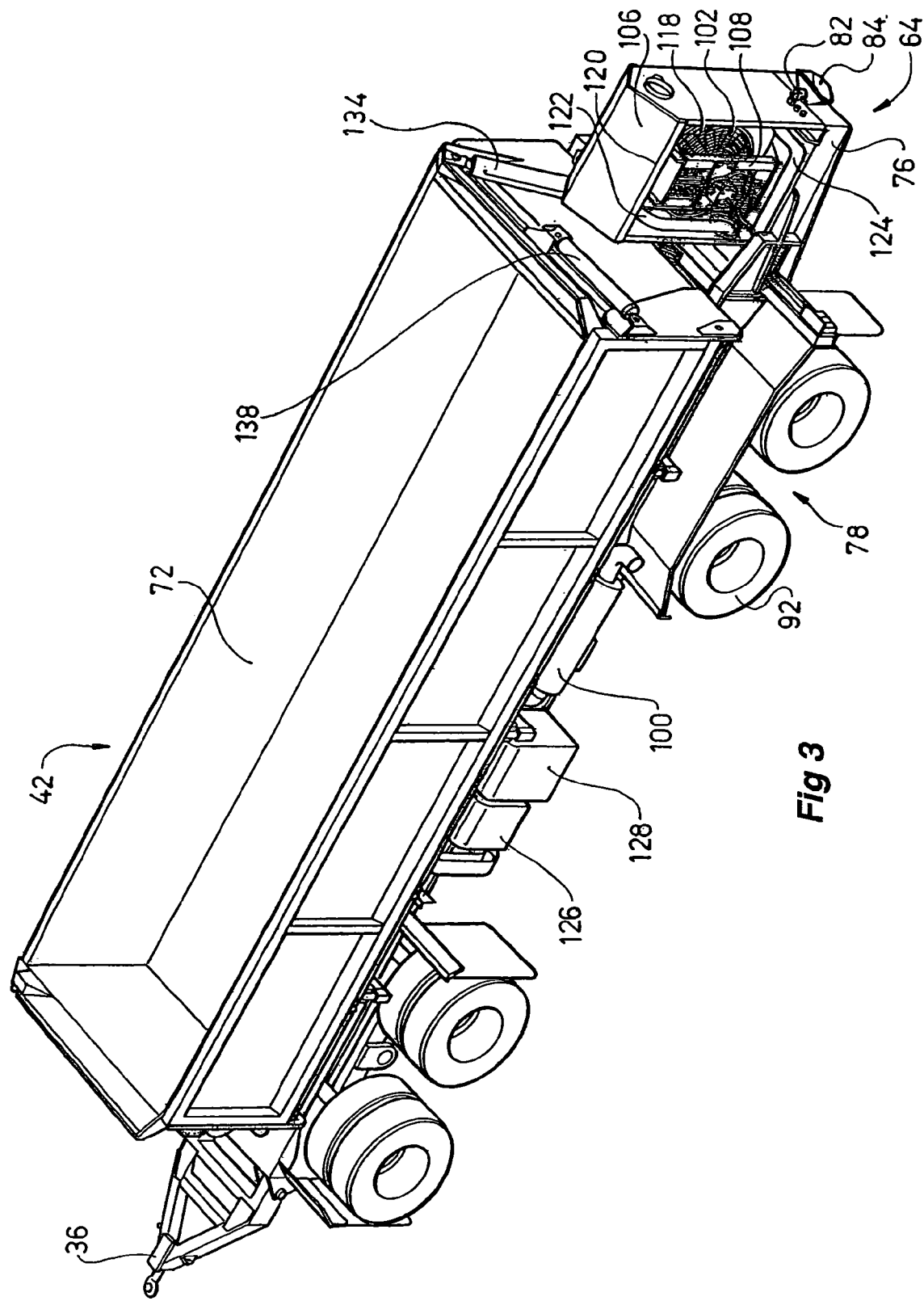
FIG. 3 is a rear perspective view of the power trailer of FIG. 2.

Turning now to the drawings in detail there is shown in FIG. 1 a multi-combination vehicle 10 including a truck 12 mechanically coupled to a plurality of trailers 14. A power trailer 16 extends from forwardly located trailers 14a and 14b and a further trailer 14c is coupled to the power trailer 16. A second power trailer 18 is coupled to the last trailer 14c. It is however to be understood that the multi-vehicle combination may include one or more power trailers, depending on the application.

The truck 12 includes a chassis or frame 20 and a rear axle assembly 22, which is suspended from and disposed below the chassis 20. Forward axle 24 comprises the steering axle of the truck 12. The rear axle assembly 22 is suspended from chassis 20 via suspension 26 and includes wheeled axles 28. Both of the wheeled axles may be driving axles, or alternatively only one is a driving axle. The driving axles may be a tridem axle assembly in lieu of the tandem axle assembly 22 and possibly suspended with a mechanical suspension.

The truck 12 further includes a motive power source 30 and a transmission (not shown) for transmitting torque from the motive power source 30 to the drive axles 28. Typically the motive power source comprises a diesel engine and the transmission for transmitting torque from the engine 30 to the drive axles 28 includes a gear box, a drive shaft, and a differential (not shown). Alternatively, the motive power source 30 may comprise other types of internal combustion engines utilising a variety of fuels.

The truck includes a draw frame 32 attached and rearwardly extending from the chassis 20. A coupling 34 is attached to the rear of the draw frame 32 and connected with a drawbar 36 on the trailer 14a. A bin 38 accommodates payload to be carried by the truck and may be adapted to be side tipping by being hingedly attached to the frame 20 (not shown).

Each of the trailers 14a, 14b, and 14c includes a converter dolly 40 and a semi-trailer 42, said semi-trailer having a chassis 44, a forward end with a coupling system 46 that pivotably attaches to a ball-race turntable 48 on the converter dolly. This enables the converter dolly to pivot relative to the semi-trailer about a generally vertical axis of rotation passing through the centre of the ball-race turntable. Other embodiments may however equally well be used, such as an oscillating ball-race turntable or a grease plate. The drawbar 36 is hingedly connected through pivot 50 to the chassis 52 of the converter dolly 40 and accommodates for any change in the grade of the road surface. As with the truck, the trailers 14a, 14b, and 14c, further include draw frames 54 attached and rearwardly extending from the chassis 44. A coupling 56 is attached to the rear of the trailer draw frames 54 and is connected with a drawbar 36 on the next trailer or power trailer. A bin 58 accommodates payload to be carried by the trailer and may be adapted to be side-tipping by being hingedly attached to the frame (not shown). Each trailer includes a rear axle assembly 60 typically having three axles, the mechanical details of which are well known in the art.

Power trailer 16 is coupled to trailer 14*b* using coupling arrangements as described above. The power trailer 16 includes the same mechanical features as with the other non-powered trailers 14*a*, 14*b*, and 14*c*, such as semi-trailer 42, with the addition of an engine 62 suspended generally half-way along chassis 70 and a cooling means 64 located at the front of the power trailer 16 positioned to take into account the movement necessary during a turn. Extending the chassis 66 of the power trailer dolly 68 enables the addition of the cooling means 64. Alternatively, although not shown, the cooling means 64 may be accommodated on the front of the chassis 70 of the power trailer by shortening the bin 72 when compared with the bin 58 of a non-powered trailer. A transmission system provides motive power to the rear axle assembly 74 of the power trailer 16.

Power trailer 18 also includes engine 62 mechanically coupled to the rear drive axle assembly 74 but includes the cooling means 64 located at the rear of the power trailer thereby eliminating the requirement for the extra length in the chassis of the dolly as was the case in power trailer 16 and instead extending the rear 76 of the chassis 70 to support the cooling means 64.

Referring to FIGS. 2–5, there is illustrated a power trailer such as power trailer 18 having the cooling means 64 at the rear end thereof but having a double axle rear axle assembly 78. The power trailer includes semi-trailer 42 having a chassis 70 including a rear extension 76. The chassis 70 includes a pair of longitudinally extending side members 80 and a plurality of transverse cross-members (not shown) interconnecting and attached to the side members 80. The rear axle assembly 78 is suspended from chassis 70 typically by air suspension (not shown). Alternatively the semi-trailer 42 may include a conventional mechanical spring assembly. The side members 80 support or form part of the load carrying structure such as bin 72. The load carrying structure may be a side tipping trailer, a stock crate, a fuel tank, or any other type of structure for supporting a load. As with the truck and non-powered trailers, the power trailer includes a draw frame 82 attached and rearwardly extending from the chassis 70. A coupling 84 is attached to the rear of the draw frame 82 and connected with a drawbar 36 on the next trailer or power trailer and may be adapted to be side-tipping by being hingedly attached to the chassis 70 (not shown).

The rear axle wheel assembly 78 includes wheeled axles 86. Extending above said wheeled axles are members 88 that may be used to support mudguards and the like 90. The wheeled axles 86 include a plurality of tires 92 mounted thereon for supporting the semi-trailer as it travels over a road surface.

Mounted within chassis 70 is a motive power source or engine 62 suspended generally centrally between the side members 80 and centrally within the chassis 70. A transmission 94 provides driving power from the engine 62 to the axle assembly 78 where one or more of the wheeled axles 86 may be driven. The engine is typically a diesel engine and may be advantageously include a turbocharger (not shown). To be able to fit the engine 62 in between the side members 80, the separation between the side members 80 is generally larger than that conventionally found on existing semi-trailers. However, the standard width of the wheeled axles is kept the same to keep the vehicle roadworthy. This has necessitated mounting the power trailer suspension under the side members rather than on their side. The engine 62 is supplied with combusting air through an air inlet 96. The air is then fed through to the engine via air pipe 98 and through appropriate filters. Exhaust gases are vented from the engine through exhaust outlet 100.

The cooling means 64 includes a radiator 102 to assist in cooling the engine by using an appropriate cooling fluid or coolant. In this particular advantageous embodiment the engine cooling means or the radiator 102 is mounted at the rear of the power trailer on top of frame extension 76 that extends further rearwardly from the chassis 70. Typically, the length of the frame would be extended to accommodate the radiator positioned along the frame. However, the frame may very well remain the same length as in conventional trailers, but the length of the bin 72 would be shortened to provide sufficient space to accommodate the radiator.

The radiator 102 includes coolant coils mounted in a housing 106. An air fan 108 is mounted behind coils and is driven to draw air through the coils. Located in front of the coils is a grill 110 to offer some protection to the coils from damage by debris. The air fan 108 typically includes a hydraulic motor 112 driven by the supply of hydraulic fluid through conduits 114 and 116. The air fan 108 is also housed in a protective grill 118 and is supported in position by support bars 120 extending between the top and bottom of the housing 106.

Coolant is supplied to the radiator through inlet pipe 122 and back to the engine through outlet pipe 124. The significant distance between the radiator and the engine means that the length of pipes transporting the coolant is quite long. This in itself provides an advantage in that the volume of coolant for the engine system has been greatly increased as compared to conventional engine designs where the radiator is located in front of the engine. The volume of the pipes effectively acts as a large coolant store.

Located around the engine are various compartments 126 and 128 that house the necessary control and sensing equipment for the engine such as engine starting controls and diagnostic instruments. Typically these systems include communication means with the truck so that the driver is kept advised as to the general status of the power trailer engine.

Power trailer fuel tanks 130 are located above the right hand side of the rear axle assembly 78 and act as pseudo mudguards. Side-tipping hydraulic arms 132 and 134 are provided at the front and rear of the bin respectively whilst arms 136 and 138 control opening the side of the bin 72.

Figure 6:
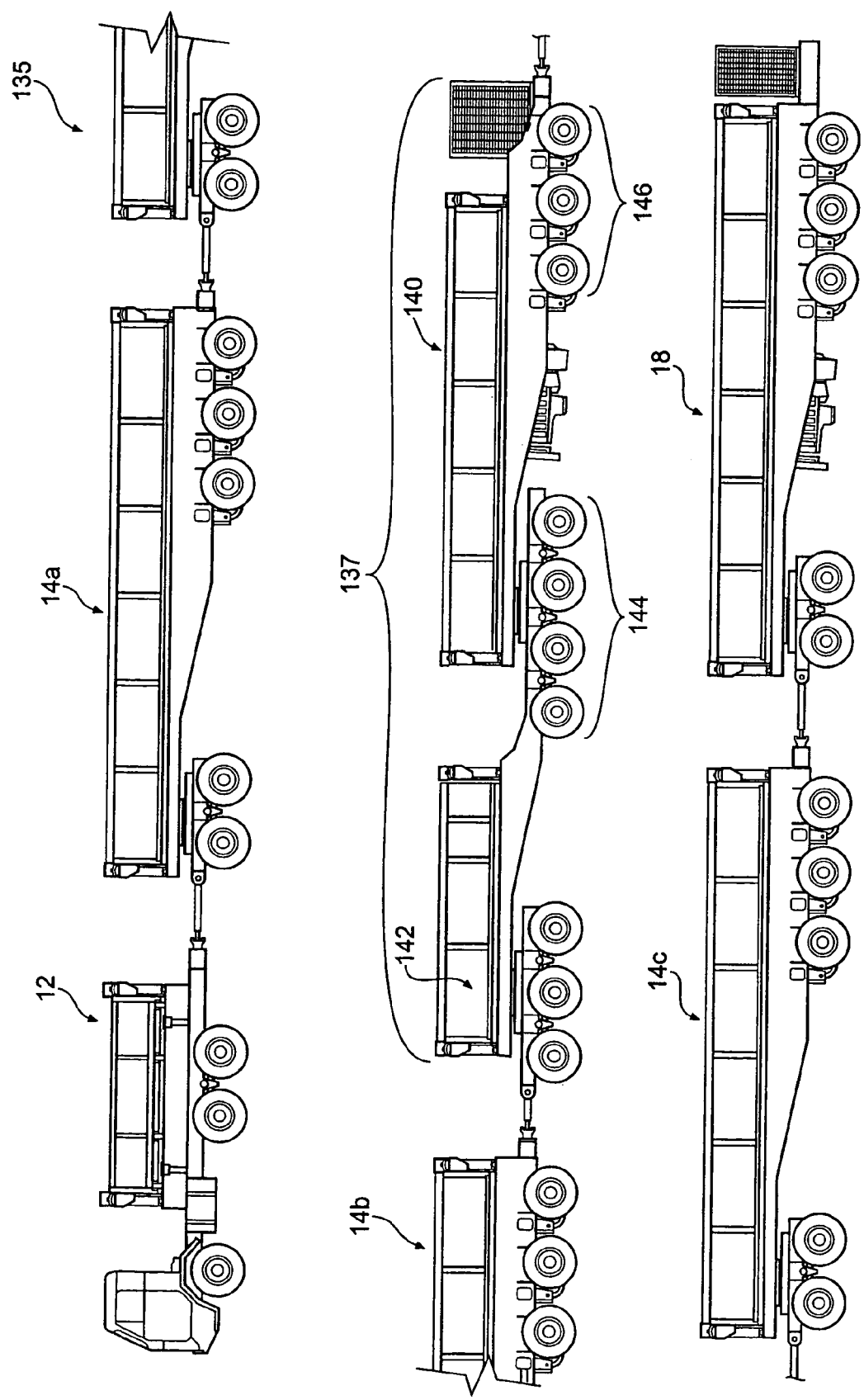
FIG. 6 is a left side elevation view of a multi-combination vehicle according to an alternative embodiment of the present invention.

FIG. 6 illustrates a multi-combination vehicle 135 wherein instead of a power-trailer as illustrated earlier, there is at least one "B-double" trailer 137 incorporating a power trailer 140 coupled to a trailer 142. The trailer 142 includes a rear axle assembly 144 that acts as a dolly for the power trailer 140. Power trailer 140 includes a tri-axle rear axle assembly 146, the configuration of the other components being similar to those described earlier and well known in the art. Rear axle assembly 144 is a quad-axle assembly. It is however to be understood that the assembly may have less axles than shown, such as a tri-axle assembly. A B-double trailer 137 configuration has been found to provide improved directional stability. In the case of a long multi-combination vehicle, this enables the operator to assemble a multi-combination vehicle having a total combination of approaching up to 10 trailers and power trailers.

The above description illustrates a multi-combination vehicle 135 having multiple power trailers and a single prime mover or truck. We now discuss the throttle control systems of such a multi-combination vehicle. For ease of understanding we will discuss an embodiment where there is only one truck and one power trailer. It is however to be understood that the control system may equally well apply to one or more power trailers and it is not intended to limit the present application to a multi-combination vehicle having only one power trailer. Equally well the system may apply to a single vehicle having two or more engines where one of the engines is controlled by a separate throttle control.

It is further to be understood that the control system the subject of the present invention relates to a multi-combination vehicle of the type where the truck and the power trailer throttle controls are independent of each other. Such an arrangement would typically be used where the truck transmission is a manual type one whilst the trailer is an automatic one. Since a driver would not be able to control manual transmission systems of two engines, the transmission system of the power trailer is an automatic one. However, it is not intended to limit the multicombination vehicle to a truck of the manual transmission type. The present invention may be used in a multicombination vehicle where the truck and power trailer both have an automatic transmission and where the throttle controls are separate. For brevity, the following description assumes that the truck utilises a manual transmission.

Each of the engines includes engine on-board computer management systems, which not only measure a number of parameters such as the torque, fuel injected, and the engine rpm's (revolutions per minute) but also enable a throttle input to drive the engine.

The throttle for the truck is typically an electronic pedal where the amount of throttle provided to the engine is proportional to the depression of the pedal. Such a throttle is typically biased so that it requires a constant force to keep the throttle in the one position. Of course there are cruise control system that may be employed to keep the truck running at a preset speed or preset fuel consumption.

Figure 7:
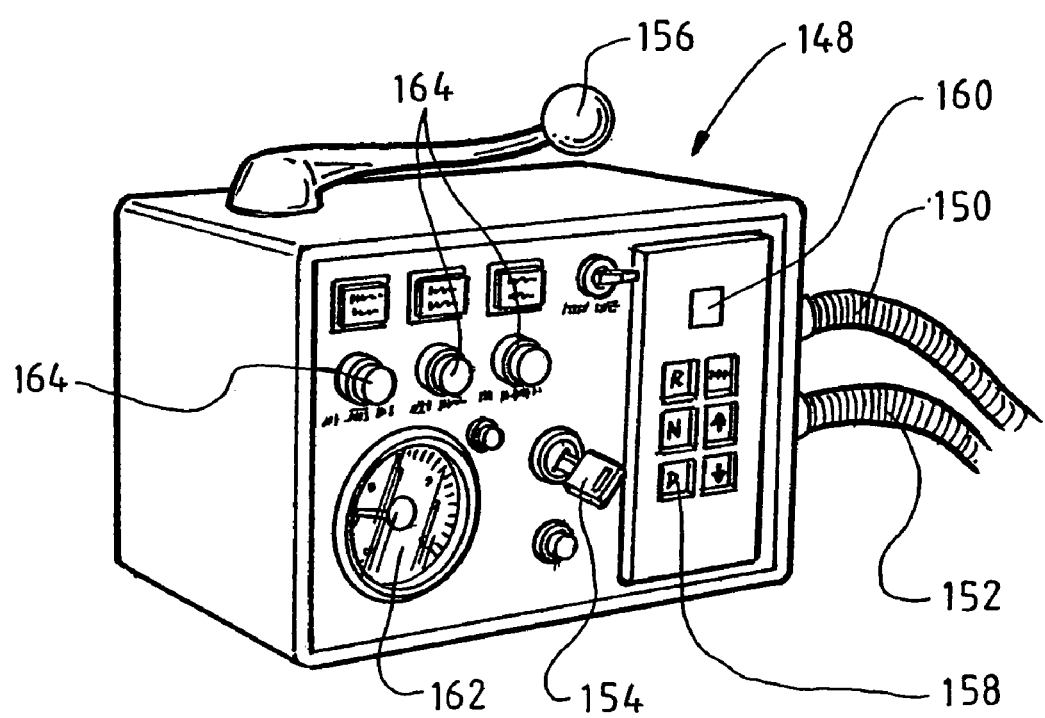
FIG. 7 is a perspective view illustrating an electronic hand-throttle control according to the present invention.

The control system 148 for the power trailer engine is located within easy reach of the driver's hand and is illustrated in FIG. 7. The control system 148 communicates with the power trailer engine via cables 150 and 152.

Located on the control system 148 is a trailer ignition key 154 and hand throttle 156 as well as a transmission control pad 158 having a display 160 and enabling the driver to control the automatic transmission as is well known in the art.

The control system 148 includes diagnostic indicators such as a tachometer 162 and various visual indicators such as lamps 164 provide a visual warning to the driver if, for example, the oil temperature, water temperature and air pressure are not in the acceptable range.

The hand throttle control 156 is a pivotable variable throttle lever, between a first position setting the engine speed to idle and in a second position running the engine "flat-out" or full throttle. The lever remains in its location until operated on by the driver, that is it is not biased to the idle position.

Those skilled in the art would appreciate the difficulty of controlling a multi-combination vehicle where there are separate throttles and typically the power trailer engine is operated assuming a load all the time, that is, "flat out". This operating condition is fine when the multicombination vehicle is travelling at its desired speed but is not appropriate when the vehicle is slowing down of working at a smaller rate. At that time, the driver is able to simultaneously operate both the foot throttle for the control of the truck engine and the hand throttle for the control of the power trailer engine. Over time an experienced driver can drive such a multicombination vehicle without any difficulties.

However, as discussed earlier, there is a serious safety problem to consider where the driver may apply emergency braking. Under those operating conditions the driver typically removes their foot from the pedal and applies the foot brake in a very fast time, reacting to the emergency. Typically the driver does not have the time or the presence to throttle down the power trailer engine using the hand throttle. To do so would also compromise the emergency braking procedure for the driver would need to take at least on hand off the steering wheel at a time where control of the vehicle was paramount.

In the simplest form therefore, it is possible for the present invention to force the trailer engine to idle as soon as the driver has applied emergency braking. Whilst this is appropriate so long as the driver keeps the necessary pressure on the braking system, there is a further issue in that when the braking has been removed the trailer engine would then power up again. This may also be undesirable in situations where the driver has fully stopped only to find that once braking has been removed the trailer engine starts to propel the vehicle yet again.

Accordingly, the present invention also provides for a system where when the driver or operator of the multicombination vehicle applies braking, the hand throttle signal to the power trailer engine is ignored to force the trailer engine to idle regardless of the position of the hand throttle, hereinafter referred to as "forced idle", and to keep it in that position even if the braking is then removed.

In a further aspect of the invention, the forced idle occurs only when a pre-determined threshold level of braking is applied so that when the driver applies only a gentle braking, forced idle is not activated.

The circuit illustrated in FIG. 8 and discussed in more detail later provides the forced idle condition where when emergency braking is applied the circuit is latched or active.

Once the circuit has been activated, the hand throttle is inactive even when the vehicle has stopped until the hand throttle is brought back to a predetermined position at which point the circuit controlling the forced idle is deactivated. Typically this requires the hand throttle to be brought back to the idle position that then enables the operator to power up the power trailer engine as normal.

Of course, to prevent damage to the power trailer transmission, as soon as emergency braking is applied and the power trailer engine brought to forced idle, the trailer automatic transmission is forced from a lock-up mode or direct drive mode to a torque converter mode to quickly release power and prevent the power trailer engine from stalling.

An additional feature of the invention is that the power trailer automatic transmission is forced to neutral to immediately release the power if the multicombination vehicle speed is below a pre-determined value, for example, 20 km/h.

Figure 8:
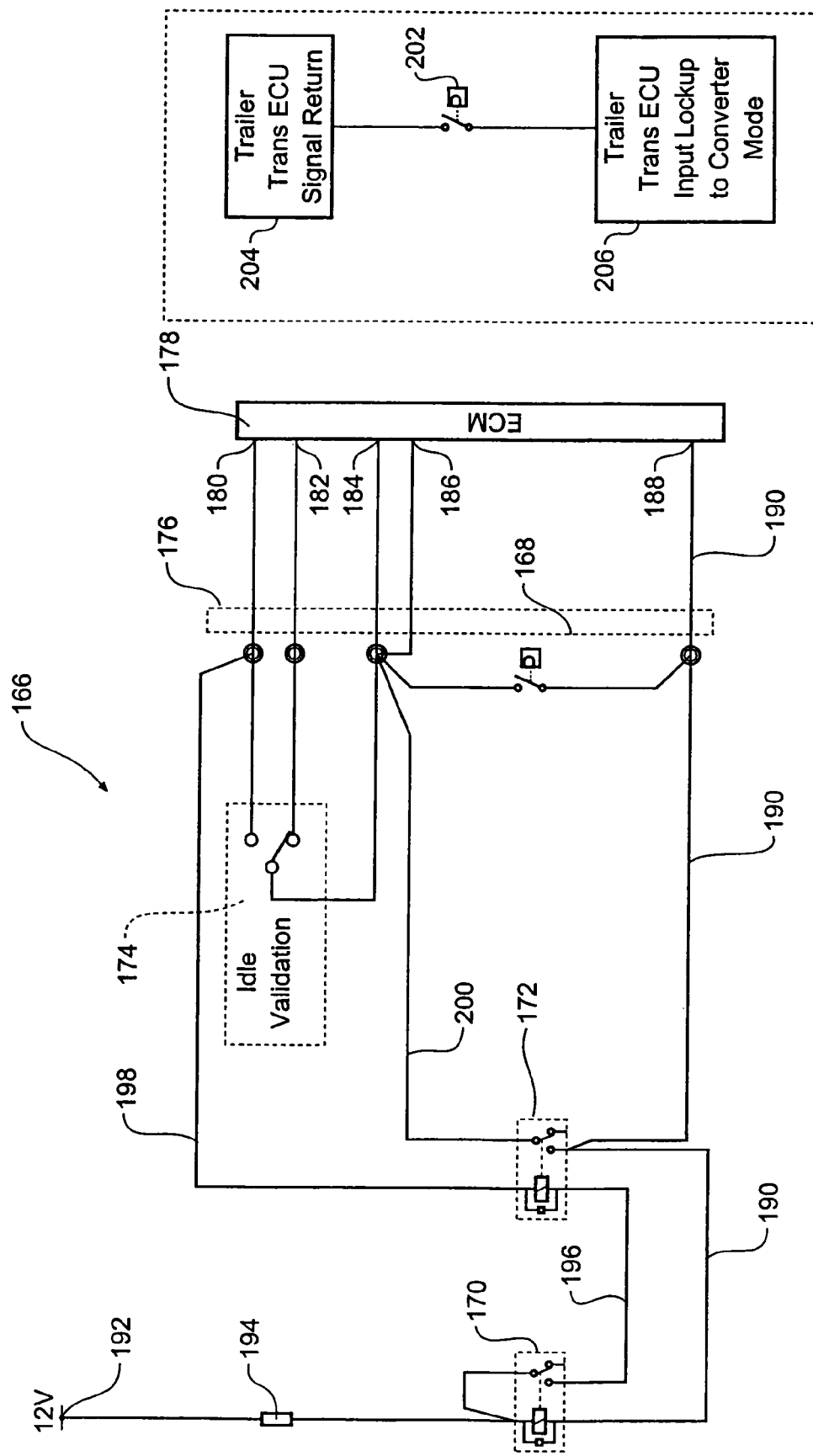
FIG. 8 is a schematic circuit diagram illustrating the system for control of two engines under braking according to the present invention.

Referring now specifically to FIG. 8 there is provided a control circuit 166 for the forced idle condition as described above. The circuit 166 includes an air switch 168, a first relay 170, second relay 172, idle validation switch 174, trailer cabinet connection 176 and ECM (Engine Control Management) 178. The ECM is well known in the art and is common in current engines with typical engines providing numerous inputs and outputs from the engine. Thus the ECM includes input 180 that provides information to the ECM 178 when the idle validation switch 174 is in the off-idle position, input 182 to provide information to the ECM 178 when the idle validation switch 174 in the on-idle position, output 184 that provides a ground as does output 186 and input 188 that commands the engine to idle.

It is to be understood that the configuration of the ECM illustrated in FIG. 8 is to be representative only and that various engines may very well have different ECM configurations. It is however to be assumed that all engine ECM's will be able to have a force idle input as well as a ground output.

Air switch 168 is nominally in an open position as illustrated in FIG. 8. However, the air switch 168 is connected to the truck braking system (not shown) so that when a pre-determined pressure is exceeded, typically some 30–35 psi that corresponds to heavy truck braking in the case of air brakes, air switch 168 closes. One side of the air switch is connected to ground terminals 184 and 186 of the ECM 178, those terminals also connected to the forced idle validation switch 174.

When the air switch 168 closes it therefore provides a ground to ECM input 188 using electrical connection 190 that forces the engine to idle. This clearly ensures that when emergency braking is applied, the engine is forced to idle so that it does not work against the applied braking. However, as discussed above, if the air switch then opens, as would be the case when braking is removed, input 188 would no longer be grounded and the engine would power up again. Accordingly the system is further provided with a latching relay that overcomes this problem as is now described.

Electrical connection 190 that is provided ground through air switch 168 when closed is also connected to relay 170. The skilled addressee will be well versed in the operation of relays and it is not intended to discuss them in detail in this specification. It suffices to say that a relay includes a coil that requires both a positive voltage and a ground to operate a switch from a first to a second position. In this case relay 170 is always provided a positive 12 Volt supply 192 that is the standard power supply in vehicles, typically through fuse 194. Thus when the relay 170 is fed ground through connection 190 it operates to close its switch which then provides positive 12 Volt power to second relay 172 through connection 196. Relay 172 is electrically connected to the idle validation switch 174 through electrical connection 198.

In the open position, as shown in FIG. 8, connection 198 is open circuited. However, when the idle validation switch is in the closed position, that is when the hand throttle has been applied, connection 198 is provided a ground through idle validation switch 174 that is connected to the ECM ground terminals 184 and 186. This then causes relay 172 to operate closing its switch that then links ground through connection 200 providing a direct connection from the ground terminals 184 and 186 of the ECM 178 to the engine idle input 188. That is, the engine idle input 188 is effectively provided a ground both through the air switch 168 and through the second relay 172 that acts as a latching relay.

That is, even if the driver then stops braking thus opening switch 168, ground is still provided to the input 188 through relay 172 that is connected using connection 200 to ground outputs 184 and 186. Since relay 172 also provides ground to relay 170 through connection 190 the circuit remains in this latched position.

Accordingly to reset the operation of the circuit 166 it is necessary that the idle validation switch 174 be physically moved to the on-idle position, whereby connection 198 is no longer provided a ground from ECM output terminals 184 and 186. This then causes relay 172 to de-energise (since there is no longer a potential difference) so that relay 170 and input 188 are no longer grounded effectively releasing the circuit and enabling the hand throttle control to operate the second engine.

Thus when the driver normally removes their foot from the foot brake, the circuit is still latched when the hand-throttle is in the "on" position. The skilled addressee will now appreciate that relay 170 only supplies power to relay 172 when the braking has been applied. Relay 172 acts as a latching relay being provided ground (or negative) when the hand throttle is in the "on" position.

In addition, the preset invention provides for a system to ensure that when hard braking is applied there is a change in the transmission modes.

A separate air switch 202 is provided in the same braking line as air switch 168. The air switch 202 is provided between trailer transmission control unit 204 and trailer transmission input 206 whereby when the air switch is operated the transmission goes from lockup to converter mode. The transmission converter mode changes the position of the stall converter from lock up 1:1 drive to slipping mode of converter mode, whereby it instantaneously removes power through the drive-line. That is, it is forced to a torque converter slipping mode to quickly release power and prevent the engine from stalling.

Figure 9:
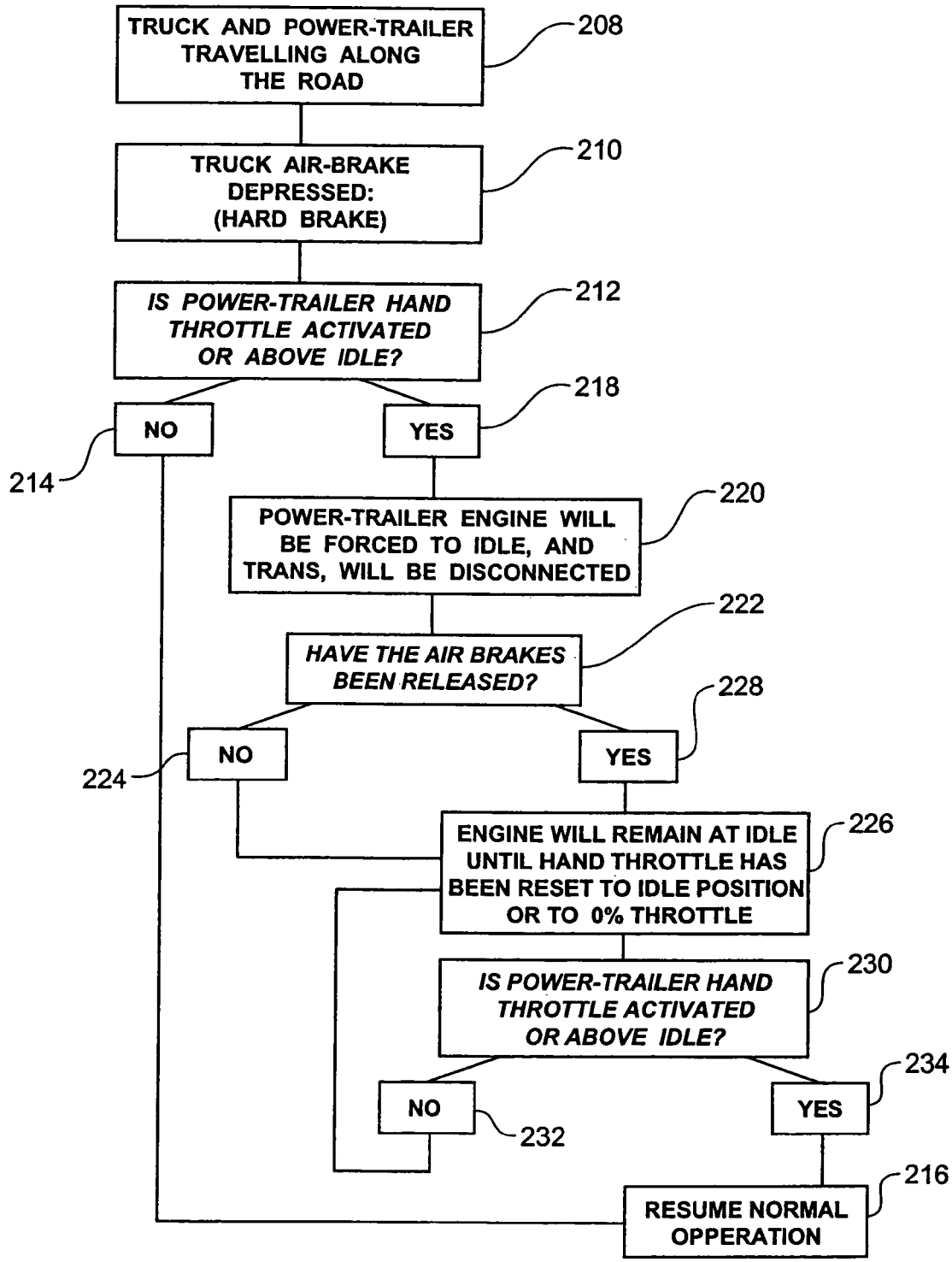
FIG. 9 is a flow chart illustrating the logic behind the control of two engines according to the present invention.

FIG. 9 is a flow chart illustrating the logic behind the throttle operation of the two engines. In a multi-combination vehicle travelling along a road (block 208) where one of the engines is controlled by a normal throttle pedal and the other by another control, usually hand controlled, when the driver applies emergency or severe braking (block 210), a determination is made if the hand throttle is above a pre-set level, usually idle (block 212). If the hand throttle is not above idle, that is No (block 214) than normal operation is resumed (block 216). Under normal operation, the driver needs not do anything other than normal, that is, drive the vehicle.

If the hand throttle is above idle, that is Yes (block 218) than the second engine is forced to an idle position whilst at the same time its transmission is disconnected (block 218).

A determination is then made if the air brakes have been released (block 222). If No (block 224) then the engine remains at idle until the hand throttle has been reset to its idle position or 0% throttle (block 226). Even if Yes (block 228) the engine is still at idle until the hand throttle is reset. Of course the reset position need not be the idle position and it may even be in some cases that the engine needs to be completely switched off to reset the hand throttle control.

A determination is then made if the hand throttle has been activated or above idle (block 230). If No (block 232) the engine will remain at idle until it is activated (block 226). If Yes (block 234) then the driver can resume normal operation. That is, the second engine is being throttled and the driver can safely operate the first engine and the multi-combination vehicle.

Those skilled in the art will appreciate that the present invention complements and further enhances the multi-combination vehicles and various features whose details were described in the United States and International Applications discussed earlier.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A system for the control of engines in a vehicle operable by a driver, the vehicle having at least two engines and a brake, said system including:
    a first throttle control operating said first of two engines said throttle control operable by said driver;
    a second throttle control operating said second of said two engines and operable by said driver;
    a braking means operable to cause said vehicle to brake, said braking means being a brake pedal operable by said driver; and
    a brake sensing means adapted to cause said second engine to idle when said driver applies braking greater than a pre-determined value regardless of the operation of said second throttle control.

2. A system as in claim 1, wherein said first throttle control is a biased pedal that when in its rest position causes said first engine to idle.

3. A system as in claim 2, wherein said biased pedal is operable by a foot of the driver.

4. A system as in claim 1, wherein said braking means is air operated and said brake sensing means is an air switch.

5. A system as in claim 4, wherein said pre-determined value is greater than 30 psi.

6. A system as in claim 1, wherein said second throttle control is a hand throttle control operable between a first and a second position, wherein in said first position the second engine is caused to idle and in said second position said second engine is caused to be at full throttle, the hand throttle remaining in its operating position between said first and second positions independently of the operation of said first throttle, wherein when said driver applies braking said second engine is caused to idle regardless of the operating position of said hand throttle.

7. A system as in claim 6, wherein when said driver has applied braking, said second engine is caused to idle and to remain in the idle position until said hand throttle is operated to a reset position.

8. A system as in claim 7, wherein said reset position is said first position of said second throttle, wherein said second engine is caused to idle.

9. A system as in claim 1, wherein said vehicle comprises a multi-combination vehicle including a truck and a trailer, said truck powered by said first engine and said trailer powered by said second engine.

10. A multi-combination vehicle operable by a driver including:
    a powered towing unit having a first engine controlled by a first throttle, said first throttle being operable by said driver;
    a power trailer, said powered towing unit and said power trailer being mechanically coupled to one another in a series arrangement, said power trailer having a second engine controlled by a second throttle, said second throttle being operable by said driver independently of said first throttle;
    a braking means operable by said driver to apply braking to said multi-combination vehicle;
    a braking sensing means adapted to sense when said braking has been applied by said driver; and
    a second engine throttle control means wherein when said braking sensing means senses that braking greater than a pre-determined value has been applied, said second engine control means causes said second engine to idle regardless of the second throttle.

11. A multi-combination vehicle as in claim 10, wherein when said second engine has been forced to idle, said second engine remains in the idle position until said second engine throttle control means is brought back to an idle position.

* * * * *